No. 715,257. Patented Dec. 9, 1902.
E. L. GILLHAM.
PLOW.
(Application filed Aug. 4, 1902.)

(No Model.)

Witnesses
W. H. Alexander
L. B. Beach.

Inventor
E. L. Gillham
By Attorneys
Fowler & Bryson

THE NORRIS PETERS CO., PHOTO-LITHO., WASHINGTON, D. C.

UNITED STATES PATENT OFFICE.

EDWARD L. GILLHAM, OF MADISON COUNTY, ILLINOIS.

PLOW.

SPECIFICATION forming part of Letters Patent No. 715,257, dated December 9, 1902.

Application filed August 4, 1902. Serial No. 118,241. (No model.)

*To all whom it may concern:*

Be it known that I, EDWARD L. GILLHAM, a citizen of the United States, residing in the county of Madison, in the State of Illinois, have invented a certain new and useful Plow, of which the following is such a full, clear, and exact description as will enable any one skilled in the art to which it appertains to make and use the same, reference being had to the accompanying drawings, forming part of this specification.

My invention relates to improvements in plows, and while it may be applied to any form of plow it is more particularly adapted to be used in connection with a disk plow. In plows as heretofore constructed, and especially in disk plows, the upper part of the soil containing the turf or stubble is not completely turned under; but part of it lies at or near the surface of the ground, so that it is pulled out of the ground when the harrow is used.

The object of my invention is to provide a plow with means for scraping or cutting off this top portion of the soil containing the turf or stubble, so that the same may be thrown off in front of the main body of the soil and thus be completely covered.

My invention consists in a plow provided with a blade for cutting or scraping off the top of the soil containing the turf or stubble, so that the said turf or stubble may be completely covered by the main body of the soil.

Figure 1:
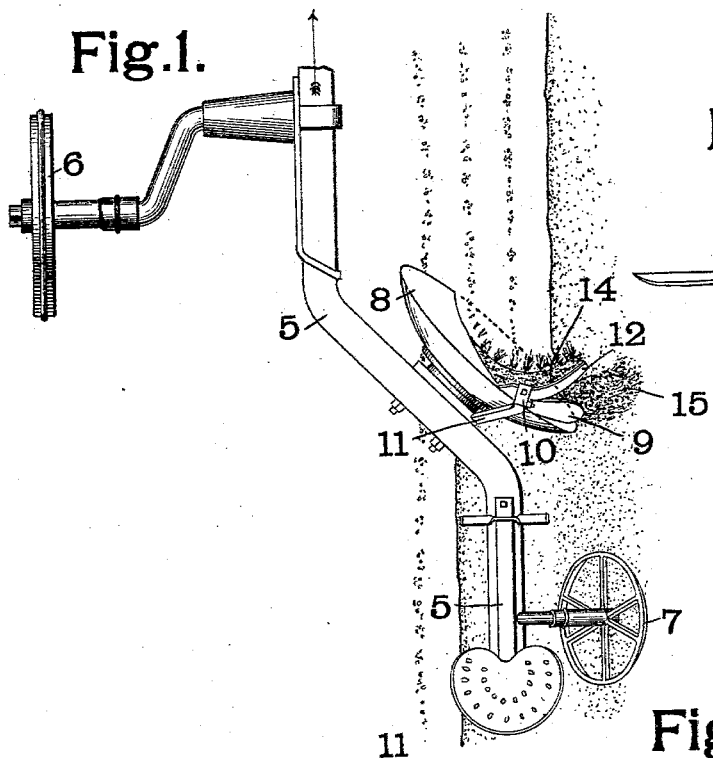
Figure 2:
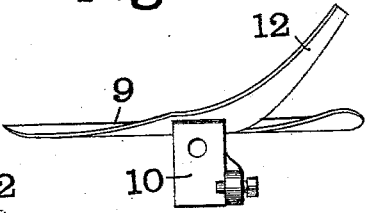
Figure 3:
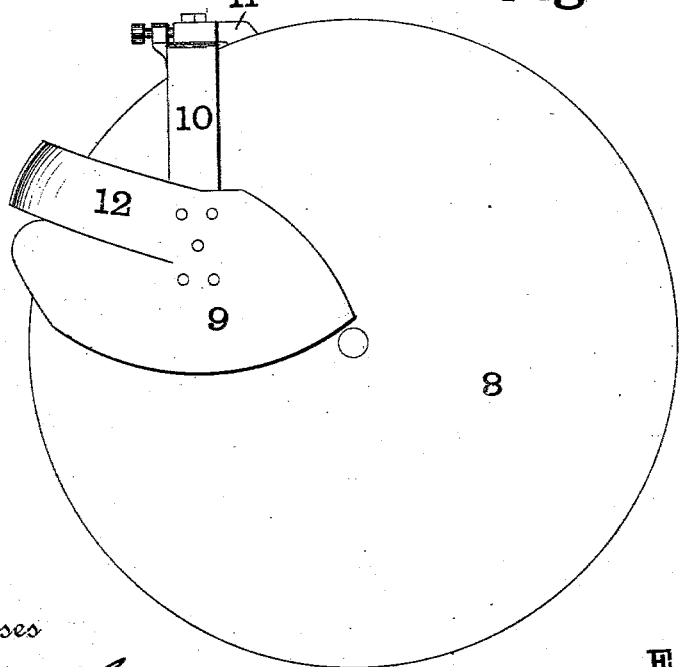

In the accompanying drawings, which illustrate my invention as applied to a disk plow, Figure 1 is a top plan view. Fig. 2 is an enlarged top plan view of the moldboard or scraper, and Fig. 3 is a front elevation of the disk and moldboard.

Like marks of reference refer to similar parts in the several views of the drawings.

5 is the frame of an ordinary disk plow. The frame 5 is carried on wheels 6 and 7 in the usual manner.

8 is the disk, which is of the usual form and is rotatably carried by the frame 5. The disk 8 is provided with a moldboard or scraper 9, which removes the soil from the disk 8 and also acts as a moldboard to turn the soil over. The moldboard or scraper 9 is carried by an arm 10, which is secured in the usual manner to a support 11 on the frame 5. The moldboard or scraper 9 is of the usual form, except that it is provided with a blade 12, preferably formed integral with the body of the said scraper 9. This blade 12 projects forwardly from the scraper 9, as best shown in Fig. 2.

In the operation of my plow the soil is cut by the disk 8 in the usual manner and passes it to the scraper or moldboard 9, which removes it from the said disk and turns it over. In place, however, of falling with part of the stubble or turf near the surface in the usual manner the blade 12 cuts or scrapes away the top 14 of the soil, as shown in Fig. 1, and allows it to fall down in front of the main body of the soil 15, so that the said stubble or turf is completely covered by the main body of the soil.

Having fully described my invention, what I claim as new, and desire to secure by Letters Patent of the United States, is—

The combination with a disk plow, of a scraper for said plow, and a blade carried by said scraper.

In testimony whereof I have hereunto set my hand and affixed my seal in the presence of two subscribing witnesses.

EDWARD L. GILLHAM. [L. S.]

Witnesses:
W. A. ALEXANDER,
A. C. FOWLER.